United States Patent [19]
Lu

[11] Patent Number: 5,148,892
[45] Date of Patent: Sep. 22, 1992

[54] QUICK STAND ADJUSTING DEVICE

[76] Inventor: Ching-Shui Lu, No. 7, Newputz, Shin-Zen, Tan-Shui, Taipei, Taiwan

[21] Appl. No.: 762,342

[22] Filed: Sep. 19, 1991

[51] Int. Cl.⁵ .............................................. E06C 7/44
[52] U.S. Cl. ............................ 182/201; 248/188.4; 182/111
[58] Field of Search ............... 182/201, 204, 205, 111; 248/188.2, 188.4, 188.8

[56] References Cited

U.S. PATENT DOCUMENTS

| | | | |
|---|---|---|---|
| 2,911,134 | 11/1959 | Derby | 182/201 |
| 3,021,921 | 2/1962 | Poelvoorde | 182/201 |
| 4,744,441 | 5/1988 | Sandstrom | 182/201 |
| 4,766,976 | 8/1988 | Wallick | 248/188.8 |
| 4,792,017 | 12/1988 | Grove | 182/204 |
| 4,995,474 | 2/1991 | Gauthier | 182/201 |

*Primary Examiner*—Reinaldo P. Machado
*Attorney, Agent, or Firm*—Fleit, Jacobson, Cohn, Price, Holman & Stern

[57] ABSTRACT

A quick stand adjusting device for adjusting the height of the stand of a ladder, a chair, an instrument or equipment, comprising a split retainer controlled by a control device, which is comprised of a crank, a transmission rod and a movable stop block, to move in and out of a recessed chamber in a lock socket at the bottom so as to engage or release a support which is extendibly inserted in the stand.

6 Claims, 5 Drawing Sheets

QUICK STAND ADJUSTING DEVICE

BACKGROUND OF THE INVENTION

The present invention relates to an quick stand adjusting device and relates more particularly to a quick stand adjusting device for adjusting the height of an object's stand quickly conveniently.

The stand for a furniture or equipment may be adjustable so that the total height of a furniture or equipment can be conveniently adjusted to the desired level. According to conventional methods, the height of a furniture or equipment stand may be adjusted by means of adjusting an adjusting screw or rotating the furniture or equipment body supported thereon. In order to firmly maintain a stand in position, the adjusting screw therein, if and, should be screwed tight. If an adjusting screw is screwed tight, a tool may be required for unfastening the adjusting screw during stand adjusting operation. Either by means of adjusting an adjusting screw or rotating a furniture or equipment body, it is difficult to estimate how much force should be applied during adjusting operation. Further, according to conventional structures, a stand may break away from its adjusted Position easily due to damage to the teeth of the connecting parts in the stand adjusting device.

SUMMARY OF THE INVENTION

The present invention has been accomplished to eliminate the aforesaid problems. It is therefore an object of the present invention to provide a quick stand adjusting device for adjusting the height of a stand, which can be easily quickly adjusted with less labor effort. It is another object of the present to provide a quick stand adjusting device for adjusting the height of a stand, which is durable and practical in use and provides high security. It is still another object of the present invention to provide a quick stand adjusting device for adjusting the height of a stand, which can be directly operated with fingers without the use of any tools.

According to the present invention, there is provided a quick stand adjusting device which is generally comprised of a hollow stand for supporting an object, a movable support extendibly inserted in said hollow stand and adjusted to support said hollow stand at the desired height, a lock cap secured to said hollow stand at the bottom and movably sleeved on said support, a base socket attached to said lock cap at the bottom and movably sleeved on said support, a split retainer set between said lock cap and said base socket, and a control device which is comprised of a transmission rod controlled by a crank to move a movable stop block up and down. When the movable stop block is moved to a higher level position, the split retainer is set into a recessed chamber in the lock cap at the bottom and forced to firmly retain the support to the hollow stand. When the movable stop block is moved to a lower level position, the split retainer is released from the lock cap, and therefore, the support is released from the hollow stand for moving back and forth relative to the hollow stand.

DETAILED DESCRIPTION OF THE PREFERRED EMBODIMENT

Figure 1:
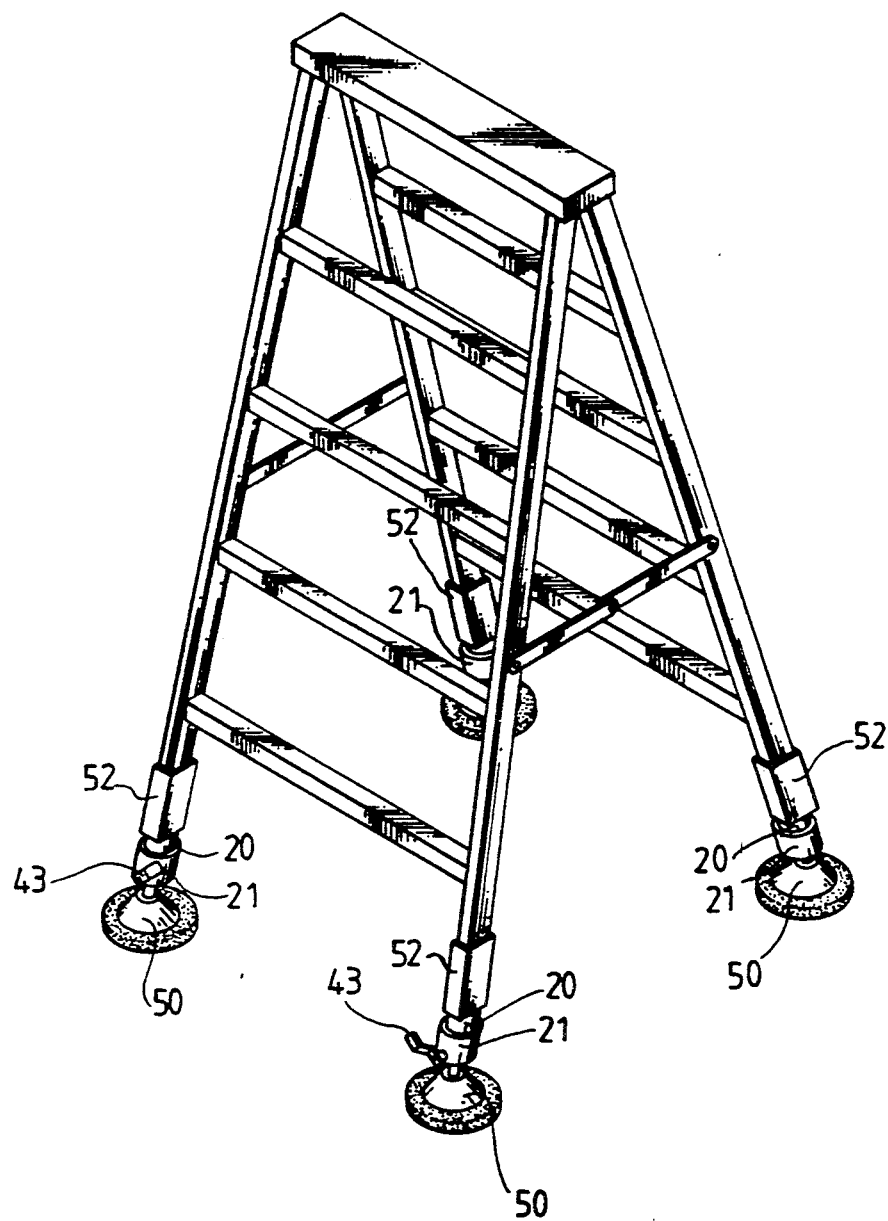
FIG. 1 is an elevation view of a platform ladders as constructed according to the present invention.
Figure 2:
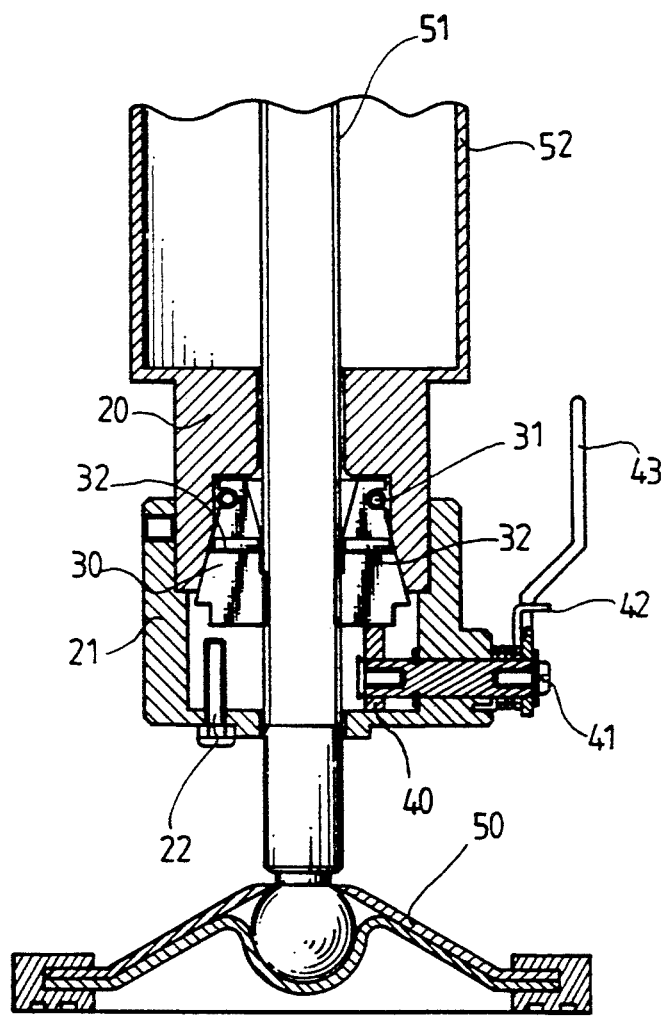
FIG. 2 is a cross sectional view of the preferred embodiment of the quick stand adjusting device of the present invention taken in longitudinal direction.

Referring to FIG. 2, a quick stand adjusting device as constructed in accordance with the present invention is generally comprised of a base socket 21, a supporting screw 22, a retainer 30, a lock cap 20, a stand 52, a support 51, a movable stop block 40, a transmission shaft 41, a crank 43, an elastic member 42, and an elastic binder 31.

Figure 3:
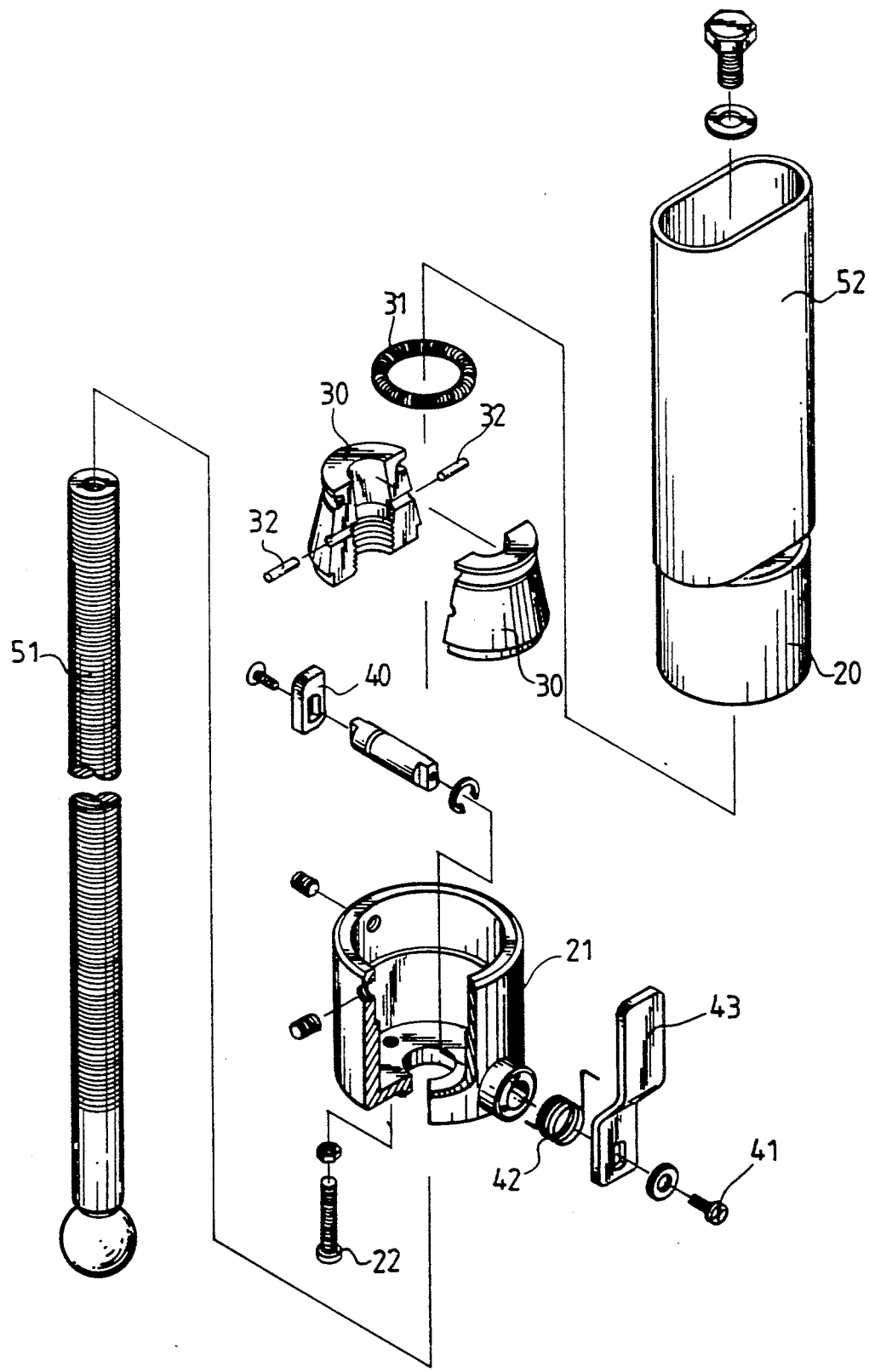
FIG. 3 is a prespective dismantled view of the preferred embodiment of the quick stand adjusting device of present invention.
Figure 4:
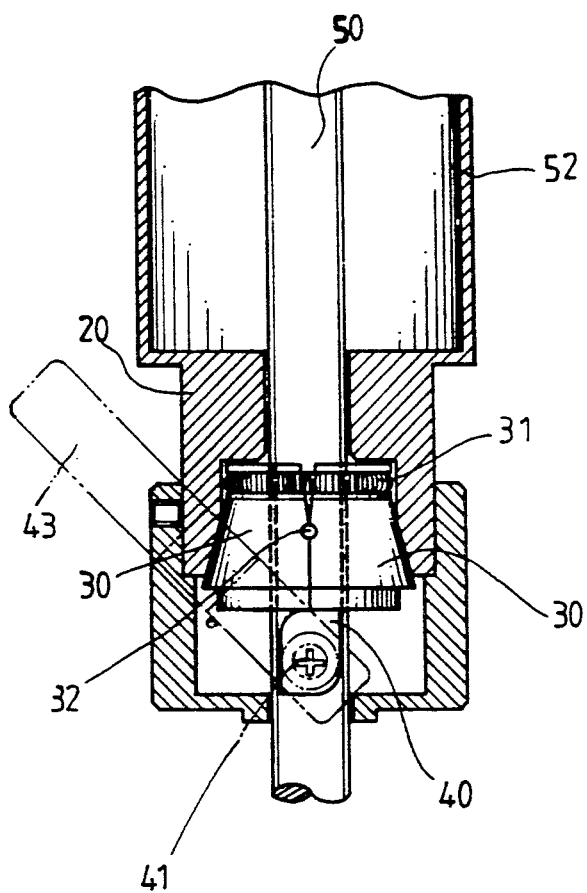
FIG. 4 illustrates that the movable stop block is moved to the "high level" position, causing the retainer to engage into the support.
Figure 5:
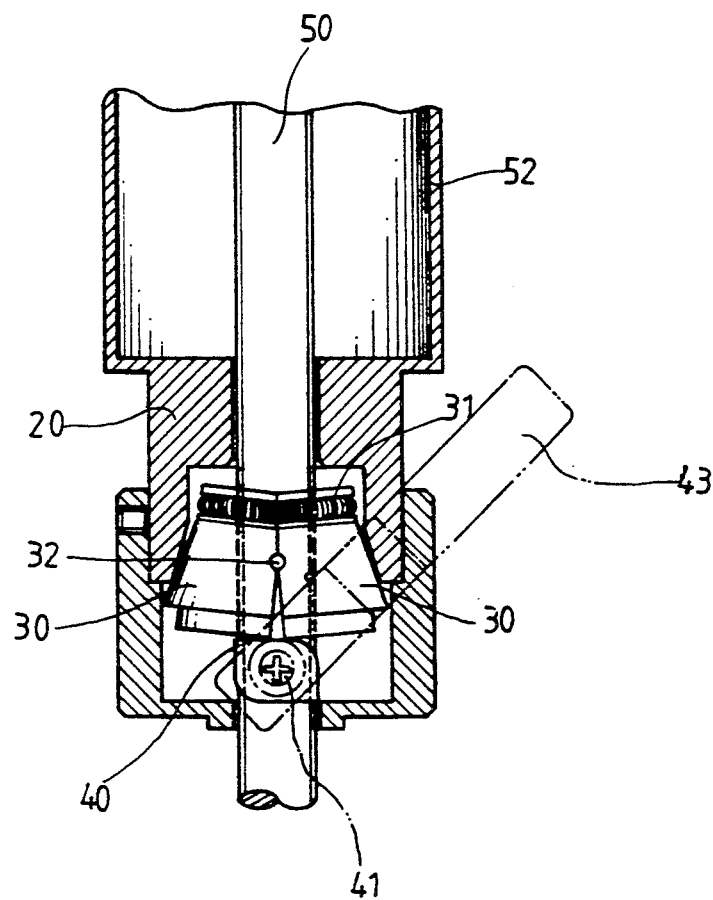
FIG. 5 illustrates that the movable stop block is moved to the "low level" position, causing the retainer to disengage from the support.

The lock cap 20 has a connecting portion coupled to the base socket 21 and defines therein a recessed chamber at the bottom. The supporting screw 22 is fastened at the bottom of the base socket 21. The retainer 30 which has a tapered outer surface is consisted of two sections each of which has a toothed portion at the inside engaged with each other and a bearing point 32 at the middle constantly pressed against each other. The two sections of the retainer 30 are tied up together by the elastic binder 31 at the top. The bearing point 32 on each section of the retainer 30 serves as a fulcrum in a lever so that the toothed portions of the two sections of the retainer 30 can be forced to disengage from each other. When the tapered outer surface of the retainer 30 is received inside the recessed chamber and squeezed by the lock cap 20, the two sections of the retainer 30 are forced to rotate on the bearing points 32 thereof causing the lower parts of the two sections to gather together, and therefore, the toothed portions of the two sections are forced to firmly engage into the support 51. The movable stop block 40 is set between the retainer 30 and the base socket 21, which can be moved to two opposite positions (see FIGS. 3 and 4) by the crank 43 via the transmission shaft 11. FIG. 3 shows that the movable stop block 10 is moved to a "High Level" position. When the movable stop block 40 is moved to the "High Level" position, the retainer 30 is moved into the recessed chamber in the lock cap 20, and therefore, the retainer 30 is forced to firmly engage into the support 51. FIG. 4 shows that the movable stop block 40 is moved to a "Low Level" position. When the movable stop block 40 is moved to the "Low Level" position, the retainer 30 is moved out of the recessed chamber in the lock cap 20, and is stopped at the supporting screw 22, and the effect of the elastic binder 31 fastened at the top of the two sections of the retainer 30 causes the retainer 30 to disengage from the support 51. Therefore, the retainer 30 can be controlled to engage into or disengage from the support 51 by means of the operation of the crank 43 and the transmission shaft 41. Further, because of the effect of the elastic member 42, the crank 43 is constantly maintained in such a position that the movable stop block 10 is kept at the "High Level" position. This arrangement keeps the retainer 30 constantly retaining the support 51 in position. Because the stand 52 can be coupled to the lock cap 20 or the base socket 21, and the lock cap 20 and the base socket 21 can be moved relative to the support 51, the support 51 can be extended out of the stand 52 and fixed at the desired position by means of holding the lock cap 20 or the base socket 21 and rotating the crank 43.

The quick stand adjusting device of the present invention can be conveniently adjusted by means of the control of the control device which is consisted of the crank 43, the movable stop block 40 and the transmission shaft 41 simply by holding the lock cap 20 or the base socket 21 while rotating the crank 43, the retainer 30 is controlled to firmly retain the support 61 or disengage therefrom. This adjusting operation is easy to perform without the use of any tools.

Further, when the stand 52 bears a load (when a person sits thereon or a thing is loaded thereon), the gravity of the load will be applied at the lock cap 20, because the stand 52 is coupled to the look cap 20 or the base socket 21, causing it to squeeze on the tapered outer surface of the retainer 30, and therefore, the retainer 30 will be forced to firmly engage into the support 51.

What is claimed is:

1. A quick stand adjusting device comprising: a hollow stand for supporting an object;
    a support extendibly inserted in said hollow stand;
    a base socket, said base socket having a through-hole through which said support is inserted and a connecting portion;
    a lock cap, said lock cap having a through-hole through which said support is inserted and a connecting portion coupled to the connecting port on said base socket and secured to said hollow stand at the bottom;
    a retainer set between said base socket and said lock cap, said retainer having a tapered peripheral surface and being consisted of two sections, said two sections each having a toothed portion at an inner side;
    a control device comprised of a movable stop block and a transmission rod, said movable stop block being disposed between said retainer and said base socket and controlled to move up and down by said transmission rod; and
    wherein rotating said transmission rod causes said movable stop block to be alternatively moved toward or apart from said retainer causing said retainer to lock said support in position or to disengage from said support for adjusting the position of said support relative to said hollow stand.

2. The quick stand adjusting device as set forth in claim 1, wherein the lock cap has a recessed chamber for receiving said retainer and, wherein said control device further comprises a crank for driving said transmission rod to move said movable stop block, and an elastic member for holding said crank in such a position that said retainer is pushed by said movable stop block into said recessed chamber so as to firmly lock said support in position.

3. The quick stand adjusting device as set forth in claim 1, wherein the lock cap has a recessed chamber for receiving said retainer and which further comprises a spring means set in said recessed chamber between said lock cap and said retainer, said spring means being to automatically push said retainer out of said recessed chamber when said movable stop block is moved apart from said retainer.

4. The quick stand adjusting device as set forth in claim 1 wherein said retainer has an elastic binder fastened thereon at the top to secure said two sections together and, said two sections each has a bearing point at the middle pressed against each other so that the lower parts of said two sections can be forced to space from each other when said retainer is caused to disengage from said support.

5. The quick stand adjusting device as set forth in claim 1, wherein said support is a screw rod.

6. The quick stand adjusting device as set forth in claim 1, wherein said retainer is a split nut.

* * * * *